US011250504B2

(12) United States Patent
Forrester et al.

(10) Patent No.: US 11,250,504 B2
(45) Date of Patent: Feb. 15, 2022

(54) SYSTEMS AND METHODS FOR PROVIDING USER-CONTROLLED AUTOMOBILE FINANCING

(71) Applicant: CAPITAL ONE SERVICES, LLC, McLean, VA (US)

(72) Inventors: Katherine D. Forrester, Dallas, TX (US); Patrick A. Eberle, Frisco, TX (US); Nicholas Dolle, McKinney, TX (US); Steven G. Chiagouris, Plano, TX (US); Joanna R. Hartzmark, Chicago, IL (US); Xiaoxiang Zhang, McKinney, TX (US); Kurt Johnson, Dallas, TX (US); Kenneth S. Childs, Mechanicsville, VA (US)

(73) Assignee: Capital One Services, LLC, McLean, VA (US)

( * ) Notice: Subject to any disclaimer, the term of this patent is extended or adjusted under 35 U.S.C. 154(b) by 6 days.

(21) Appl. No.: 16/673,435

(22) Filed: Nov. 4, 2019

(65) Prior Publication Data

US 2020/0065898 A1 Feb. 27, 2020

Related U.S. Application Data

(63) Continuation of application No. 15/826,956, filed on Nov. 30, 2017, now Pat. No. 10,467,690, which is a
(Continued)

(51) Int. Cl.
*G06Q 40/02* (2012.01)
(52) U.S. Cl.
CPC ................ *G06Q 40/025* (2013.01)

(58) Field of Classification Search
None
See application file for complete search history.

(56) References Cited

U.S. PATENT DOCUMENTS 6,965,874 B2 * 11/2005 Joseph .................. G06Q 30/06
705/26.62
7,076,462 B1 * 7/2006 Nelson .................. G06Q 40/02
705/38
(Continued)

OTHER PUBLICATIONS

Author unknown, RoadLoans.com® Launches Car-Financing Application for the iPhone, Jan. 10, 2011, retrieved from https://www.prnewswire.com/news-releases/roadloanscom-launches-car-financing-application-for-the-iphone-113229749.html (Year: 2011).*

(Continued)

*Primary Examiner* — Gregory S Cunningham, II
(74) *Attorney, Agent, or Firm* — Perkins Coie LLP

(57) ABSTRACT

Methods and systems are disclosed for providing approved financing in advance of a purchase to a buyer of an item, such as an automobile, and allowing the prospective buyer to maintain control over the financing throughout the sales process. According to disclosed embodiments, a financial service system configures a financing website for the buyer, and receives personal information as well as information relating to the desired item. The financial service system approves loan parameters for the buyer, and provides the user with a link to access the financing website on a mobile device while at a dealership. Financing parameters can thus be edited throughout the process until the final sales agreement, providing the buyer with confidence and flexibility in the buying process.

18 Claims, 12 Drawing Sheets

Related U.S. Application Data continuation of application No. 14/445,519, filed on Jul. 29, 2014, now abandoned.

(60) Provisional application No. 61/860,000, filed on Jul. 30, 2013.

(56) References Cited

U.S. PATENT DOCUMENTS

| | | | |
|---|---|---|---|
| 7,630,933 B2 | 12/2009 | Peterson et al. | |
| 8,204,766 B2* | 6/2012 | Bush | G06Q 40/08 |
| | | | 705/4 |
| 8,204,788 B1 | 6/2012 | Ivankovich et al. | |
| 8,660,943 B1 | 2/2014 | Chirehdast et al. | |
| 8,671,051 B1* | 3/2014 | Sandoval | G06Q 40/02 |
| | | | 705/38 |
| 2001/0039516 A1 | 11/2001 | Bennett et al. | |
| 2002/0019804 A1 | 2/2002 | Sutton | |
| 2003/0041019 A1 | 2/2003 | Vagim, III et al. | |
| 2003/0182229 A1 | 9/2003 | Siegel et al. | |
| 2004/0107146 A1 | 6/2004 | Alfano et al. | |
| 2005/0080722 A1* | 4/2005 | Kemper | G06Q 40/02 |
| | | | 705/38 |
| 2005/0289045 A1 | 12/2005 | Lawson | |
| 2007/0078697 A1 | 4/2007 | Nixon | |
| 2007/0136162 A1 | 6/2007 | Thibodeau et al. | |
| 2007/0136163 A1 | 6/2007 | Bell | |
| 2007/0265960 A1* | 11/2007 | Advani | G06Q 40/025 |
| | | | 705/38 |
| 2008/0015954 A1 | 1/2008 | Huber et al. | |
| 2008/0126244 A1 | 5/2008 | Loving et al. | |
| 2009/0043705 A1* | 2/2009 | Bishop | G06Q 20/108 |
| | | | 705/42 |
| 2009/0048966 A1 | 2/2009 | Bishop et al. | |
| 2010/0023447 A1 | 1/2010 | Mac Innis | |
| 2010/0042491 A1 | 2/2010 | Halleck et al. | |
| 2010/0070382 A1 | 3/2010 | Inghelbrecht et al. | |
| 2011/0166994 A1 | 7/2011 | Ross et al. | |
| 2012/0101891 A1 | 4/2012 | Collier et al. | |
| 2013/0339217 A1 | 12/2013 | Breslow | |
| 2014/0229363 A1* | 8/2014 | Orloff | G06Q 40/025 |
| | | | 705/38 |

OTHER PUBLICATIONS

"Capital One Auto Loans—New and Used Auto," Website 2004, and 2011.

"Hibernia to boost credit card business; Capitol One's muscle to grow with merger" by Mary Judice and Stewart Yerton Business writers, Times—Picayune (New Orleans, La] May 22, 2005; F. 01. Buying Your Ride by Stern, Linda. Newsweek 145.25 (Jun. 20, 2005); 71.

* cited by examiner

YourBANK

REQUIRED DOCUMENTS

Before getting an approval code you can take to a dealer, a few more details need to be verified.

Identification

Upload a photo or scan of the front and back of your driver's license or government issued ID. Image files can be a gif, jpg, jpeg, png or pdf and must not exceed 2mb in size.

[ UPLOAD FILE ]  Or fax images to 1-858-858-1234
Cover sheet link here

Proof of Income

Upload a photo or scan of your most recent pay stub. Image files can be a gif, jpg, jpeg, png or pdf and must not exceed 2mb in size.

[ UPLOAD FILE ]  Or fax images to 1-858-858-1234
Cover sheet link here

Personal References

Enter people you've worked with at a job, committee or other organization.

Name                  Contact
[Full Name]           [###] [###] [####]
Name                  Contact
[Full Name]           [###] [###] [####]

[ SUBMIT REFERENCES ]

FIG. 8

YourBANK

YOU'RE APPROVED! But before you buy, submit required loan documents.

Approved up to: $30,000  
APR between: 5.15%–12.60%  
Ready to buy? Show your approval code to the dealer.  
APPROVAL CODE: ABCD1234

| Select a Vehicle | Choose an Eligible Dealer |

Let's get more specific

Amount and term options will vary depending on vehicle make, model, age and mileage.

- Is this vehicle new or used?
- Select Year
- Select a Make
- Select Model
- Select Trim Package
- [ ]

[ SEE CONTRACT TERMS ]

[ FIND AN ELIGIBLE DEALER >> ]

FIG. 9

YourBANK

YOU'RE APPROVED! But before you buy, submit required loan documents.

Approved up to: $30,000   APR between: 5.15%–12.60%   Ready to buy? Show your approval code to the dealer.
APPROVAL CODE: ABCD1234

| Select a Vehicle | Choose an Eligible Dealer |

Enter City, State, Address or Zip Code

Dallas, Texas

⊙ Grand Prairie Ford
701 East..., Dallas, TX 2.1 mi
[GET DIRECTIONS] [SET APPOINTMENT] [WEBSITE]

⊙ Autoflex Leasing
556 South..., Dallas, TX 3.2 mi
[GET DIRECTIONS] [SET APPOINTMENT] [WEBSITE]

⊙ David McDavid Honda
3700 West..., Dallas, TX 3.4 mi
[GET DIRECTIONS] [SET APPOINTMENT] [WEBSITE]

⊙ David McDavid Honda
3700 West..., Dallas, TX 3.4 mi
[GET DIRECTIONS]

⊙ David McDavid Honda
3700 West..., Dallas, TX 3.4 mi
[GET DIRECTIONS]

[READY TO HEAD TO THE DEALER? >>]

FIG. 11

YourBANK

READY TO GO TO A DEALER?

Get your smartphone.

[Mobile number ▼] [TEXT ME THE LINK]

Print a copy.

[PRINT THIS PAGE]

YOU STILL HAVE REQUIRED DOCUMENTS TO SUBMIT

In order to complete your loan you can provide your required documents via this site or make sure you take the following information to the dealer with you.

☑ Government issued ID   ☐ Proof of Income   ☑ Contact information for two personal references

$30,000  6.60%-12.60%   APPROVAL CODE: ABCD-1234RIC
Approved amount  Approved APR*   Show this code to the dealer when you go shopping.

Your vehicle choices

2011 VOLKSWAGEN GTI 4-DOOR
Your loan total is $21,000
Monthly Payment: $474.83
APR: 8.53%

Update this vehicle

2011 HONDA ACCORD EX-L
Your loan total is $21,000
Monthly Payment: $474.83
APR: 8.53%

Update this vehicle

Eligible dealers in Dallas, Texas

Change your location

Grand Prairie Ford
701 East Palace Parkway
Grand Prairie, TX 75228
[GET DIRECTIONS] [SET APPOINTMENT] [WEBSITE]

John Eagle Sport City Toyota
12650 LBJ Freeway
Grand Prairie, TX 75228
[GET DIRECTIONS] [SET APPOINTMENT] [WEBSITE]

Autoflex Leasing
556 South Central Expy
Grand Prairie, TX 75228
[GET DIRECTIONS] [SET APPOINTMENT] [WEBSITE]

David McDavid Honda
3700 West Airport Freeway
Grand Prairie, TX 75228
[GET DIRECTIONS] [SET APPOINTMENT] [WEBSITE]

FIG. 12

SYSTEMS AND METHODS FOR PROVIDING USER-CONTROLLED AUTOMOBILE FINANCING

CROSS-REFERENCE TO RELATED APPLICATIONS

This application is a continuation of U.S. patent application Ser. No. 15/826,956, filed Nov. 30, 2017, which is a continuation of U.S. patent application Ser. No. 14/445,519, filed Jul. 29, 2014, which claims the benefit of priority to U.S. Provisional Application No. 61/860,000, filed Jul. 30, 2013, the disclosures of which are incorporated herein by reference in their entirety.

FIELD

The disclosed embodiments generally relate to financing sales of items and, in particular, providing buyers of automobiles the ability to secure advanced approval of financing for their purchase while retaining control of their financing throughout the process.

BACKGROUND

Advances in the financial and information technology industries have transformed the way items, such as automobiles, are bought and sold. Automobiles, for example, were once almost exclusively purchased after a prospective buyer ventured onto the lot of the local car dealership. The dealer generally controlled the entire sales process, and there was little transparency in the process for the buyer. Buyers typically had no choice but to defer to whatever financing options and terms the dealer offered.

The digital revolution has lifted the veil on many aspects of the automobile purchase process. Buyers now possess power and leverage that they previously lacked, including increased ability to shop around and have dealers compete for their business. Buyers may even have the ability to secure approved financing from a financial service provider before even setting foot on the dealer's lot. In many cases however, even financing approved in advance lacks flexibility. If a buyer's personal circumstances change after the approval process, or even if they simply change their mind and select a different car than the one for which they received approval, power once again shifts to the dealer, who can alter the previously approved financing to make more profit at the buyer's expense.

Accordingly, a need exists in the current marketplace to provide buyers of items, particularly automobiles, the ability to be approved in advance for financing yet retain the ability to modify terms of the financing up through completion of the sale.

SUMMARY

Systems and methods described herein enable a computer system to provide buyers of items, such as automobiles, the ability to secure advanced approval for financing for their purchase while retaining control of their financing throughout the process. In one embodiment, a computing system may receive an indication that a buyer seeks to secure approved loan financing to purchase an item in advance of the purchase. Additionally, the computing system may receive personal information associated with the buyer. The computing system may perform a risk assessment of the prospective buyer based on the received personal information. Further, the computing system may provide qualification information to the prospective buyer, wherein the qualification information comprises at least an approved loan amount and a range of possible interest rates for the financed loan. The computing system may also receive information relating to a specific item that the buyer seeks to purchase using the approved loan amount, and may provide additional financing information associated with the specific item. Additionally, the computing system may match the buyer with a dealer for the specific item, and provide the buyer with remote access to the financing information, wherein the buyer retains the ability to alter terms of the financing during a negotiation with the dealer.

In another embodiment, a method for providing financing for a sale of an item in the form of a loan is disclosed. The method includes receiving an indication that a buyer seeks to secure approved loan financing to purchase an item in advance of the purchase. Additionally, the method comprises receiving personal information associated with the buyer. The method also includes performing, via one or more processors, a risk assessment of the prospective buyer based on the received personal information. Further, the method comprises providing qualification information to the prospective buyer, wherein the qualification information comprises at least an approved loan amount and a range of possible interest rates for the financed loan. The method also comprises receiving information relating to a specific item that the buyer seeks to purchase using the approved loan amount, and providing additional financing information associated with the specific item. Additionally, the method includes matching, via the one or more processors, the buyer with a dealer for the specific item, and providing the buyer with remote access to the financing information, wherein the buyer retains the ability to alter terms of the financing during a negotiation with the dealer.

In yet another embodiment, a computing system may receive an indication that a buyer seeks to purchase a specific item using approved financing from a financial service provider. Additionally, the computing system may perform a risk assessment of the prospective buyer. The computing system may further determine whether the specific item is available for purchase. Also, the computing system may access information relating to the buyer's approved financing, and may execute a sales agreement for purchase of the item based on the accessed information.

Additional objects and advantages of the disclosed embodiments will be set forth in part in the description which follows, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed. For example, the methods relating to the disclosed embodiments may be implemented in system environments outside of the exemplary system environments disclosed herein.

BRIEF DESCRIPTION OF THE DRAWINGS

The accompanying drawings, which are incorporated in and constitute a part of this specification, illustrate various embodiments and aspects of the disclosed embodiments and, together with the description, serve to explain the principles of the disclosed embodiments. In the drawings:

FIG. 8 is an exemplary user interface for submitting buyer information that may be provided by the disclosed embodiments;

FIG. 9 is an exemplary user interface for submitting specific item information that may be provided by the disclosed embodiments;

FIG. 11 is an exemplary user interface for providing dealer information that may be provided by the disclosed embodiments; and FIG. 12 is an exemplary user interface for providing a summary of the financing process that may be provided by the disclosed embodiments.

DETAILED DESCRIPTION

Reference will now be made in detail to disclosed embodiments, examples of which are illustrated in the accompanying drawings. Wherever convenient, the same reference numbers will be used throughout the drawings to refer to the same or like parts.

Generally, disclosed embodiments are directed to systems and methods for providing buyers of an item requiring financing the ability to secure flexible advanced approval of financing for their purchase while retaining control of their financing throughout the process. For ease of discussion, embodiments may be described in connection with the sale of automobiles. It is to be understood, however, that disclosed embodiments are not limited to the sale of automobiles and may, in fact, be applied to the sale, auctioning, etc. of any item, product, or service. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. The processes disclosed herein may be implemented by a suitable combination of hardware, software, and/or firmware. For example, the disclosed embodiments may implement general purpose machines that may be configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

Figure 1:
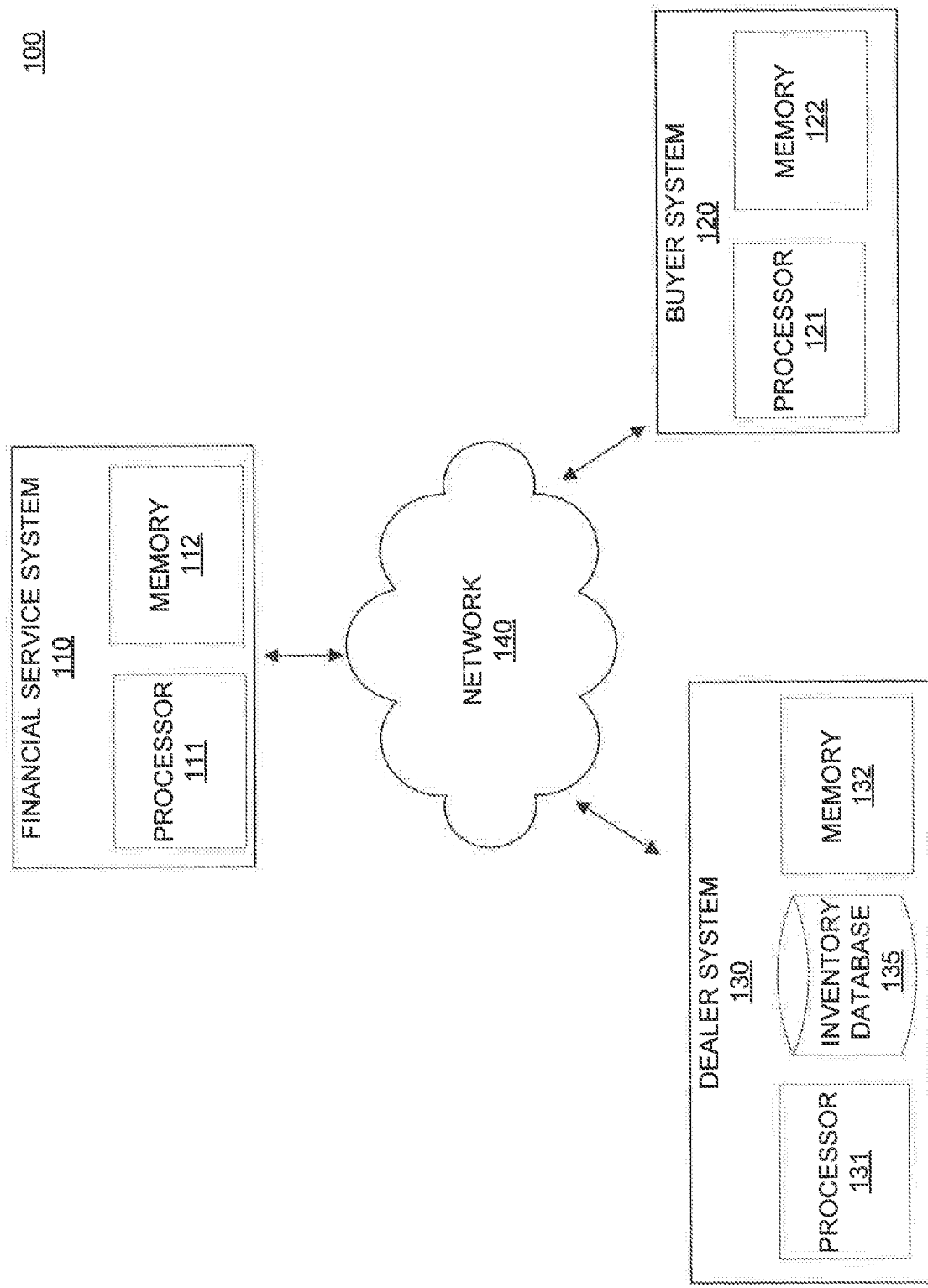
FIG. 1 illustrates an exemplary system consistent with disclosed embodiments.

FIG. 1 illustrates an exemplary system 100 consistent with disclosed embodiments. In one aspect, system environment 100 may include a financial service system 110, buyer system 120, dealer system 130, and network 140.

Financial service system 110 may be a system associated with one or more entities that configure, offer, provide, and/or manage financial service accounts, such as credit card accounts, debit card accounts, checking or savings accounts, and loan accounts. As used throughout this disclosure, a "loan" or "loan account" may include any form of financing provided to a prospective buyer of an item, including retail installment contracts, direct financing, personal loans, or any other means of providing financing known in the art. Consistent with the disclosure, financial service system 110 may provide a loan account for financing a purchase to one or more consumers operating buyer system 120. In some embodiments, financial service system 110 may receive and process payments from consumers (via, e.g., buyer system 120) relating to provided financial service accounts. Financial service system 110 may also process other funds and payments related to a sale, such as transmitting funds comprising the sales price of the item or service to dealer system 130. Financial service system 110 may be configured to assess the creditworthiness and risk presented by a prospective car buyer in real-time or substantially real-time, and to offer different financing packages depending on those assessments.

Financial service system 110 may include one or more components that perform processes consistent with the disclosed embodiments. For example, financial service system 110 may include one or more computers (e.g., servers, database systems, etc.) configured to execute software instructions programmed to perform aspects of the disclosed embodiments, such as generating financial service accounts, maintaining accounts, processing information relating to accounts, etc. Consistent with disclosed embodiments, financial service system 110 may include other components and infrastructure that enable it to perform operations, processes, and services consistent with financial service account providers, such as banking operations, credit card operations, loan operations, etc. Consistent with disclosed embodiments, financial service system 110 may be configured to provide, manage, monitor, and assess a financing program for a sales transaction between a buyer and a car dealer.

Buyer system 120 may represent a system associated with an entity seeking to buy an item from another party. Although the following description of disclosed embodiments may refer to an "individual," it is to be understood that the same description applies to multiple buyers acting in concert or to a buyer entity in the manner described above. Buyer system 120 may include one or more components that perform processes consistent with the disclosed embodiments. For example, buyer system 120 may include one or more computers (e.g., servers, database systems, etc.) that are configured to execute software instructions programmed to perform aspects of the disclosed embodiments. One of ordinary skill in the art would recognize that buyer system 120 may include components and infrastructure that enable it to perform operations, processes, and services such as processing sales transactions of purchases made over the Internet or at POS locations, and communicating with financial service system 110 or other components relating to the transactions. Buyer system 120 may be configured to purchase an item, transmit and receive information associated with the purchase transaction, and process and monitor a loan account associated with financing the purchase transaction.

Dealer system 130 may represent a system associated with an entity seeking to sell an item to another party. Although the following description of certain embodiments may refer to an "individual," one skilled in the art would appreciate that the same description applies to multiple dealers acting in concert or to a dealer entity in the manner described above. In the example of automobiles, in some embodiments, multiple dealerships of different brands of automobile may be grouped together in dealer system 130. The multiple dealerships may be owned by the same entity or different entities. In other embodiments, multiple dealerships of the same brand of automobile may be grouped together in dealer system 130. Dealer system 130 may include components and infrastructure that enable it to perform operations, processes, and services consistent with merchants, such as providing websites that offer for sale goods and/or services, processing sales transactions of purchases made over the Internet or at POS locations, and communicating with financial service system 110 or other components relating to the transactions. Consistent with disclosed embodiments, dealer system 130 may be configured to provide financing to the buyer of an item and process the sales transaction.

Inventory database 135 may represent one or more storage devices and/or systems that maintain data used by dealer system 130. Inventory database 135 may include one or more processing components (e.g., storage controller, processor, etc.) that perform various data transfer and storage operations consistent with features consistent with the disclosed embodiments. In some aspects, inventory database 135 may be associated with an independent entity that provides database services for one or more components of system environment 100, consistent with the disclosed embodiments, or for one or more similar dealer systems 130 in other system environments outside of system environment 100. Inventory database 135 may be an internal component to dealer system 130, as depicted in FIG. 1, or it may be an external device accessible by dealer system 130.

In one embodiment, inventory database 135 may store items listed for sale by entities such as dealer system 130. These listings may contain information about the items for sale, the dealer systems 130 themselves, and financing information provided by dealer system 130 and/or financial service system 110. These and other components of system environment 100, including buyer system 120, may be configured to interface with inventory database 135 via network 140 or other communication mechanisms.

Consistent with disclosed embodiments, components of system 100, including financial service system 110, buyer system 120, and dealer system 130, may include one or more processors (such as processors 111, 121, or 131) as shown in exemplary form in FIG. 1. The processors may be one or more known processing devices, such as a microprocessor from the Pentium™ family manufactured by Intel™ or the Turion™ family manufactured by AMD™. The processor may include a single core or multiple core processor system that provides the ability to perform parallel processes simultaneously. For example, the processors may be single core processors configured with virtual processing technologies known to those skilled in the art. In certain embodiments, the processors may use logical processors to simultaneously execute and control multiple processes. The processors may implement virtual machine technologies, or other similar known technologies to provide the ability to execute, control, run, manipulate, store, etc. multiple software processes, applications, programs, etc. In some embodiments, the processors may include a multiple-core processor arrangements (e.g., dual or quad core) configured to provide parallel processing functionalities to enable computer components of financial service system 110, buyer system 120, and/or dealer system 130 to execute multiple processes simultaneously. Other types of processor arrangements could be implemented that provide for the capabilities disclosed herein. Moreover, the processors may represent one or more servers or other computing devices that are associated with financial service system 110, buyer system 120, and/or dealer system 130. For instance, the processors may represent a distributed network of processors configured to operate together over a local or wide area network. Alternatively, the processors may be a processing device configured to execute software instructions that receive and send information, instructions, etc. to/from other processing devices associated with financial service provider 110 or other components of system environment 100. In certain aspects, processors 111, 121, and 131 may be configured to execute software instructions stored in memory to perform one or more processes consistent with disclosed embodiments.

Consistent with disclosed embodiments, components of system 100, including financial service system 110, buyer system 120, and dealer system 130, may also include one or more memory devices (such as memories 112, 122, and 132) as shown in exemplary form in FIG. 1. The memory devices may store software instructions that are executed by processors 111, 121, and 131, such as one or more applications, network communication processes, operating system software, software instructions relating to the disclosed embodiments, and any other type of application or software known to be executable by processing devices. The memory devices may be a volatile or non-volatile, magnetic, semiconductor, tape, optical, removable, nonremovable, or other type of storage device or tangible computer-readable medium. The memory devices may be two or more memory devices distributed over a local or wide area network, or may be a single memory device. In certain embodiments, the memory devices may include database systems, such as database storage devices, one or more database processing devices configured to receive instructions to access, process, and send information stored in the storage devices.

In some embodiments, financial service system 110, buyer system 120, and dealer system 130 may also include one or more additional components (not shown) that provide communications with other components of system environment 100, such as through network 140, or any other suitable communications infrastructure.

Network 140 may be any type of network that facilitates communications and data transfer between components of system environment 100, such as, for example, financial service system 110, buyer system 120, and dealer system 130. Network 140 may be a Local Area Network (LAN), a Wide Area Network (WAN), such as the Internet, and may be a single network or a combination of networks. Further, network 140 may reflect a single type of network or a combination of different types of networks, such as the Internet and public exchange networks for wireline and/or wireless communications. Network 140 may utilize cloud computing technologies that are familiar in the marketplace. Moreover, any part of network 140 may be implemented through traditional infrastructures or channels of trade, to permit operations associated with financial accounts that are performed manually or in-person by the various entities illustrated in FIG. 1. Network 140 is not limited to the above examples and system 100 may implement any type of network that allows the entities (and others not shown) included in FIG. 1 to exchange data and information.

Although FIG. 1 describes a certain number of entities and processing/computing components within system environment 100, any number or combination of components may be implemented without departing from the scope of the disclosed embodiments. For example, different dealer systems 130 may interact with one or more buyer systems 120 through network 140 or standard channels of trade, such as face-to-face purchase transactions. In another example, different financial service systems 110 may interact with one or more buyer systems 120 and dealer systems 130 through network 140 or standard channels of trade. Additionally, financial service system 110, buyer system 120, and dealer system 130 are not mutually exclusive. For example, in one disclosed embodiment, financial service system 110 and dealer system 130 may be the same entity or affiliated with the same entity. The entities as described are not limited to their discrete descriptions above. Further, where different components of system environment 100 are combined (e.g., financial service system 110 and dealer system 130, etc.), the computing and processing devices and software executed by these components may be integrated into a local or distributed system.

Figure 2:
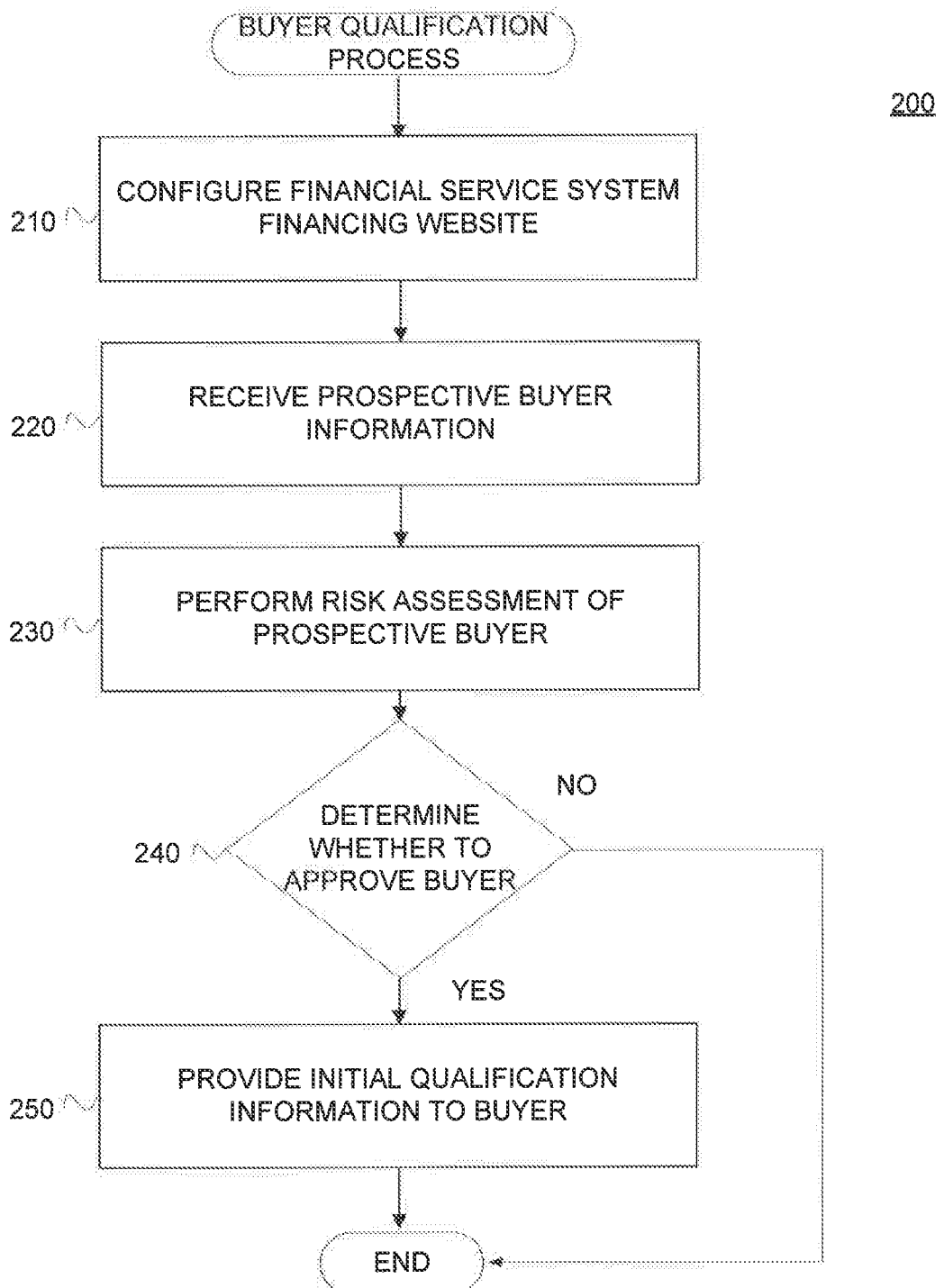
FIG. 2 is a flowchart of an exemplary buyer qualification process consistent with disclosed embodiments.

FIG. 2 illustrates an exemplary buyer qualification process 200 consistent with disclosed embodiments. As an example, FIG. 2 is disclosed in connection with financial service system 110, but it is understood that other components may perform processes to qualify a prospective buyer, such as dealer system 130. Financial service system 110 may configure a financing website (Step 210), which may be a website accessible to the public. In some embodiments, the financing website may be deployed as part of a stand-alone kiosk or other such unit within a brick and mortar banking location. The brick and mortar location may be associated with financial service system 110. In alternative embodiments, the stand-alone kiosk may be situated within a location associated with dealer system 130, or at a location affiliated with other merchants, such as an automobile trade show or a retail shopping mall. Financial service system 110 may make dealer systems 130 and prospective buyer systems 120 aware of the financing website via advertising, telephonic, postal, or electronic communication means, or by any other suitable means of communication.

Financial service system 110 may receive information about the user or users associated with buyer system 120 who seek to make a purchase via the financing website (Step 220). The information received may include, for example, name, address, social security or other government ID number, credit history, employment information, financial history, and financial service account information. In some embodiments, the information received may include digital or physical copies of government-issued identification, such as a driver's license, social security card, passport, etc. In some embodiments, the received information may include proof of income, and may be received in the form of a digital or physical copy of a pay stub, paycheck, human resources document, tax return, etc. In some embodiments, financial service system 110 may require and receive personal or business references from buyer system 120. Financial service system 110, however, may prompt for more or less information, based on characteristics of the user associated with buyer system 120, geographical location, legal restrictions, or any other concern or consideration relating to the business of financial service system 110.

Financial service system 110 may generate or receive a risk assessment, or other similar creditworthiness analysis, associated with the user or users of buyer system 120 using the information received from buyer system 120 (Step 230). Financial service system 110 may utilize additional internal information associated with buyer system 120 stored in memory 121 to perform the risk assessment. In some embodiments, financial service system 110 may access additional information associated with buyer system 120 on external servers via network 140, such as those associated with well-known credit bureaus. In some embodiments, the risk assessment may include a further evaluation of fraud risk presented by the prospective buyer, using predetermined criteria such as past criminal history, past financial history, etc. Financial service system 110 may additionally be configured to perform a verification step in which financial service system 110 may prompt buyer system 120 to verify the information received in Step 220. Financial service system 110 may require buyer system 120 to submit additional information, or to stipulate to the veracity of any and all information previously received.

Financial service system 110 may use the information received from buyer system 120, the results of the risk assessment of Step 230, and other predefined criteria to determine whether or not to accept the prospective buyer into the approved financing program (Step 240). Financial service system 110 may determine not to accept the prospective buyer into the program (Step 240; NO) based on the received information, and if so, buyer system 120 may proceed to negotiate and finance a transaction with dealer system 130 through alternative means.

Financial service system 110 may determine to accept the prospective buyer associated with buyer system 120 into the financing program (Step 240; YES). Financial service system 110 may notify buyer system 120 of the acceptance through telephonic, postal, or electronic communication means, or by any suitable well-known means of communication. In some embodiments, the acceptance and approval may occur instantly; in alternative embodiments, the acceptance, approval, and subsequent notification may occur at a later time. In some embodiments, financial service system 110 may determine that additional information is required in order to make the determination of whether or not to accept buyer system 120 into the approved financing program. In these embodiments, financial service system 110 may request the additional information from buyer system 120 through telephonic, postal, or electronic communication means.

If the prospective buyer associated with buyer system 120 is accepted, financial service system 110 may provide resources and information associated with initial qualification to buyer system 120 to assist with the purchase of the item (Step 250). The resources and information may include, as non-limiting examples, a maximum financing amount for which the prospective buyer is approved, a value or range of values of potential interest rates for a financed loan (which may be expressed in terms of annual percentage rate (APR %)), and an indicia which the prospective buyer may provide to a dealer system 130 to indicate approval. The indicia may be presented as an approval code, and may serve as a reference number for the approved financing within, for example, memories 112, 122, and 132 of the various components of system environment 100. In some embodiments, the maximum financing amount for which the buyer is approved may vary from the actual amount eventually lent to the buyer based on the particular vehicle chosen by the prospective buyer. For example, if financial service system 110 indicates to buyer system 120 that the approval amount is $30,000, and buyer system 120 ends up purchasing a car valued at $15,000, the amount lent may be significantly less than the full approved amount. But if the buyer purchases a car for $30,000, the full approved amount may be lent to buyer system 120.

Figure 3:
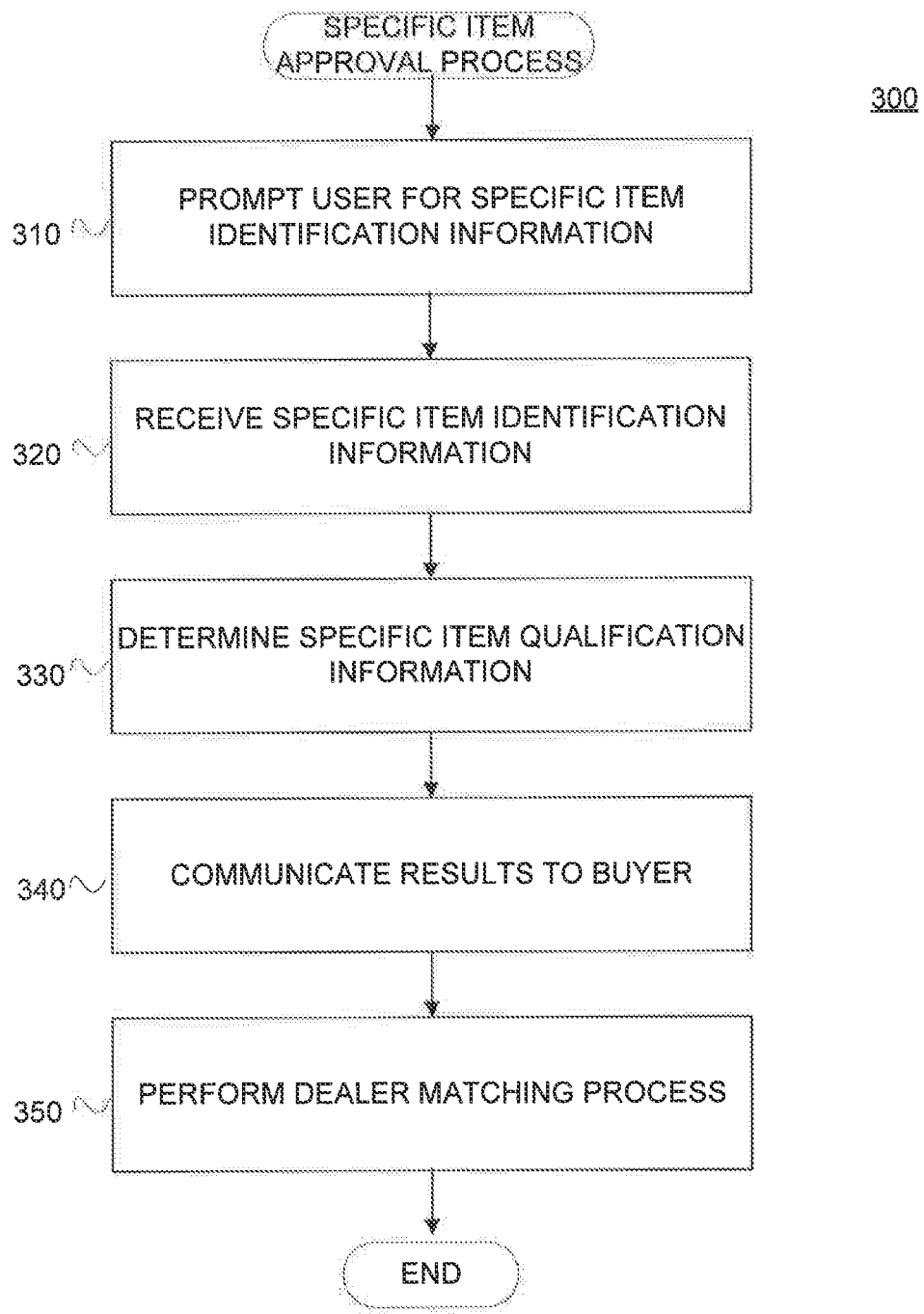
FIG. 3 is a flowchart of an exemplary specific item approval process consistent with disclosed embodiments.

The prospective buyer associated with buyer system 120 may choose to continue the purchase transaction on-site at dealer system 130 with the initial qualification information, or may opt to obtain more specific approval and more detailed information about the item to be purchased. FIG. 3 illustrates an exemplary specific item approval process 300 consistent with disclosed embodiments. As an example, FIG. 3 is disclosed in connection with financial service system 110, but it is understood that other components may perform processes to assist a prospective buyer in seeking information and approval for a specific automobile make and model, such as dealer system 130. Using the financing website configured in process 200, financial service system 110 may prompt buyer system 120 for specific identification information relating to the desired automobile (Step 310). The specific information may be related to a particular make of automobile, a particular model, or a particular set of features and options for the car. The information may be related to the age of the car, such as its model year, or its mileage. The information may be related to price, such as maximum price of the car, a range of prices, or to a promotion or incentive offer provided by dealer system 130. In some embodiments the identifying information may relate to geographic location. In some embodiments, the information may pertain to whether the car is new or used. The information may comprise a combination of any or all of these examples, which are non-limiting. After prompting buyer system 120 for the relevant information, financial service system 110 may receive the information (Step 320). The information may be received through the previously configured financing website, but may also be received by other means, such as by telephonic means, electronic mail, or postal mail.

Using the received information, financial service system 110 may determine more specific qualifying information relating to the buyer's desired item (Step 330). The information determined may include, as non-limiting examples, information relating to an automobile of a specific make, model, year, and trim package. With respect to that particular car, financial service system 110 may determine the portion of the purchase price of the car eligible for financing (up to and including the full purchase price, plus additional costs such as tax, title, license fees, gap insurance, warranties, etc.). Additionally, financial service system 110 may determine a particular monthly payment amount and APR % associated with a financing loan for that particular car. Financial service system 110, however, may determine more or less specific qualifying information relating to the buyer's desired item.

Financial service system 110 may communicate the determined information to buyer system 120 (Step 340). The communication may occur instantaneously upon completion of the determination, or may occur at a later time. The communication may again occur through the previously configured financing website associated with financial service system 110, including through a mobile application configured for a mobile device associated with the financing website, or it may occur by telephone, electronic mail, SMS message, or postal mail.

Process 300 may be repeated multiple times by the prospective buyer to gain specific approval information relating to a number of different specific cars. The information may be stored in memory 112 and/or memory 122, and be remotely accessible by any component system of system environment 100. Financial service system 110 may configure an account or online presence associated with buyer system 120, under which approval information can be stored for a set or indefinite amount of time. The prospective buyer may choose to continue the purchase transaction on-site at dealer system 130 with the initial qualification information and the specific item qualification information, or may opt to gain further information about potential dealer systems 130. If this further information is desired, financial service system 110 may perform a dealer matching process (Step 350), which will now be described in association with FIG. 4.

Figure 4:
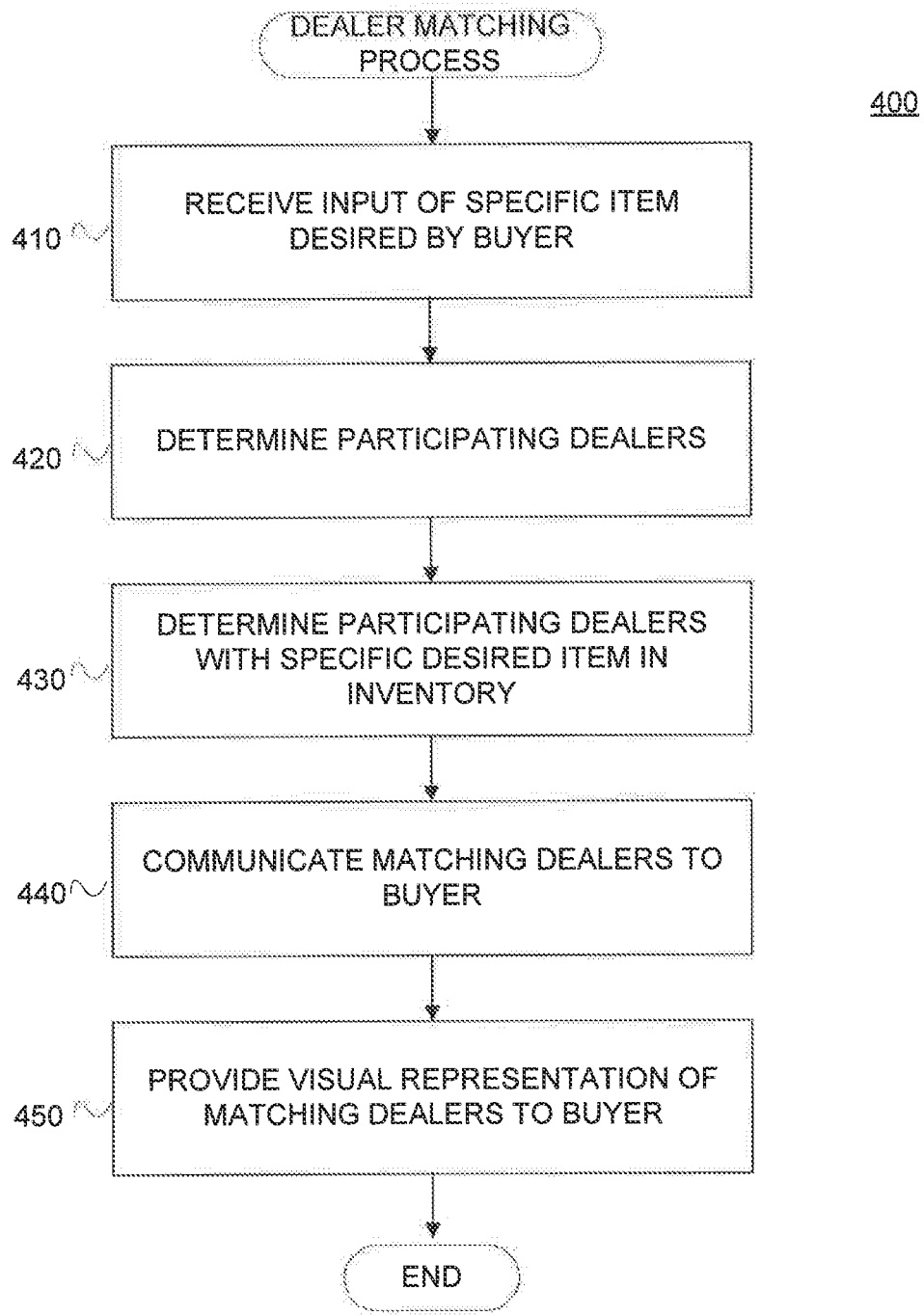
FIG. 4 is a flowchart of an exemplary dealer matching process consistent with disclosed embodiments.

FIG. 4 illustrates an exemplary dealer matching process 400, consistent with disclosed embodiments. Dealer matching process 400, as well as any or all of the individual steps therein, may be performed by any one or more of financial service system 110, buyer system 120, or dealer system 130. For exemplary purposes, FIG. 4 is disclosed as being performed by financial service system 110.

Financial service system 110 may receive or access initial qualifying information associated with buyer system 120 determined using process 200, and/or specific item qualification information determined in process 300 (Step 410). The information may be retrieved from internal memory 112, or accessed via network 140 from an account configured for buyer system 120 on the previously configured financing website.

Financial service system 110 may determine a set of dealer systems 130 that desire to participate in the approved financing program (Step 420). In some embodiments, a given dealer system 130 may contact financial service system 110 indicating willingness to participate in the program. In other embodiments, financial service system 110 may contact one or more dealer systems 130 to inquire about participation in the program or participation in a particular approved financing deal for a particular prospective buyer. In some embodiments, financial service system 110 may generate a set of eligibility criteria that dealer systems 130 must meet in order to participate in the approved financing program. The eligibility criteria may include, but not be limited to, size of the dealership associated with the system 130, gross sales figures, sales figures for a particular subset of cars (i.e., number of pickup trucks sold, number of a certain make and model sold, etc.), location, available inventory, etc. In some embodiments, financial service system 110 may additionally generate a set of rules and/or standards for participating dealer systems 130. Financial service system 110 may require assent to the rules and standards by each dealer system 130 in order to participate in the approved financing program, and may execute an agreement memorializing that assent. In these embodiments, financial service system 110 may be configured to monitor the compliance of each dealer system 130 with the assented eligibility criteria, rules, and/or standards, and may remove a dealer system 130 from the approved financing program if they are not in compliance. For participating dealer systems 130, financial service system 110 may compile basic contact information, including, but not limited to, an online web address, telephone number, contact person, available inventory, appointment calendars, etc., and store that information in memory 112.

Financial service system 110 may also determine a smaller subset of the participating dealers that have the prospective buyer's desired car in their inventory (Step 430). In some embodiments, financial service system 110 may transmit the desired car information to each participating dealer system 130, and then receive back responses from dealer systems 130 as to whether the dealer has the car in current inventory or could get one in a predetermined amount of time. In some embodiments, financial service system 110 may additionally transmit information associated with buyer system 120, such as the amount the buyer is approved for, proposed APR % on the loan, etc. The information associated with buyer system 120 may include the approval indicia or code provided to buyer system 120 during buyer qualification process 200.

In some embodiments, participating dealer systems 130 may periodically transmit information associated with their inventory to financial service system 110. The information may be sent in list form, in database form, or in any other form compatible with financial service system 110. Dealer systems 130 may transmit updated inventory lists to financial service system 110 at various predetermined points in time, such as hourly, daily, weekly, or monthly. In these embodiments, financial service system 110 may be configured to aggregate the various inventory lists received from the participating dealer systems 130, and may provide the aggregated list to buyer system 120 for purposes of finding a participating dealership associated with one or more of the dealer systems 130.

In alternative embodiments, inventory database 135 associated with dealer system 130 may be configured to be available over network 140. Inventory database 135 may be publicly accessible, or may be private to a subset of entities such as financial service system 110. In these embodiments, financial service system 110 may execute software processes to automatically search each inventory database 135 for the specific desired car. Alternatively, financial service system 110 may manually search the database 135 of each participating dealer system 130. In alternative embodiments, the financing website configured by financial service system 110 for buyer system 120 may contain a direct link to various inventory databases 135, and the databases may be searchable directly by financial service system 110, buyer system 120, or various dealer systems 130. In some aspects, having direct links to inventory databases through the financing website may increase business options for financial service system 110 and provide more attractive financing terms for buyer system 120, as each will possess more information about the financing process and the inventory available. Further, having direct links to the databases may facilitate competition among dealer systems 130, as they try to undersell each other to secure buyer system 120's business.

Financial service system 110 may communicate to buyer system 120 matching dealer systems 130 that possess buyer system 120's desired car in their inventory (Step 440). The matching dealer systems 130 may be provided to buyer system 120 in list form. In some embodiments, the list of matching dealer systems 130 may be provided to buyer system 120 substantially instantly, or may be provided at a time in the future. The list of matching dealer systems 130 may include some or all of the additional information determined by financial service system 110 relating to the dealers, such as contact information, location, etc.

To further inform and equip buyer system 120, financial service system may provide additional visual representations of information associated with the matching dealer systems 130 (Step 450). For example, financial service system 110 may generate a map for buyer system 120 displaying the locations of matching dealer systems 130, and may display the map to buyer system 120 in an electronic message or on the previously configured financing website. The visual information may additionally include other relevant items, such as user ratings or reviews of the candidate dealer systems 130, photographs of the specific desired car, photographs of a contact person associated with dealer system 130, or functionalities that give buyer system 120 additional options. For example, financial service system 110 may display a button that permits buyer system 120 to schedule an appointment or a test drive with dealer system 130. Once made, the appointment request could be sent to dealer system 130 for verification, or buyer system 120 may be able to directly make the appointment within the computer systems of dealer system 130.

Once provided with the various information generated in processes 200, 300, and 400, the prospective buyer associated with buyer system 120 may make an appointment with a particular dealer system 130 (via, in some embodiments, buyer system 120) and visit the brick-and-mortar dealership associated with dealer system 130 in person. In some embodiments, at the conclusion of any or all of processes 200, 300, or 400, financial service system 110 may provide buyer system 120 with a link to the previously configured financing website. In these embodiments, the prospective buyer associated with buyer system 120 will thus have the option to continue to edit and alter the terms of the financing until completion of the process. For example, if the prospective buyer decides that a different car in dealer system 130's inventory is desired, they can access the financing website on a mobile device (such as a buyer system 120, which may comprise one or more of a smartphone, tablet, or mobile computer system) and edit the desired car, add options and trim packages, add a warranty, etc. Financial service system 110 may then update the approved amounts and other terms of the loan based on the new information. The flexibility in this manner permits prospective buyers to maintain full control over their financing rather than surrendering control as soon as they step onto a dealership lot.

Figure 5:
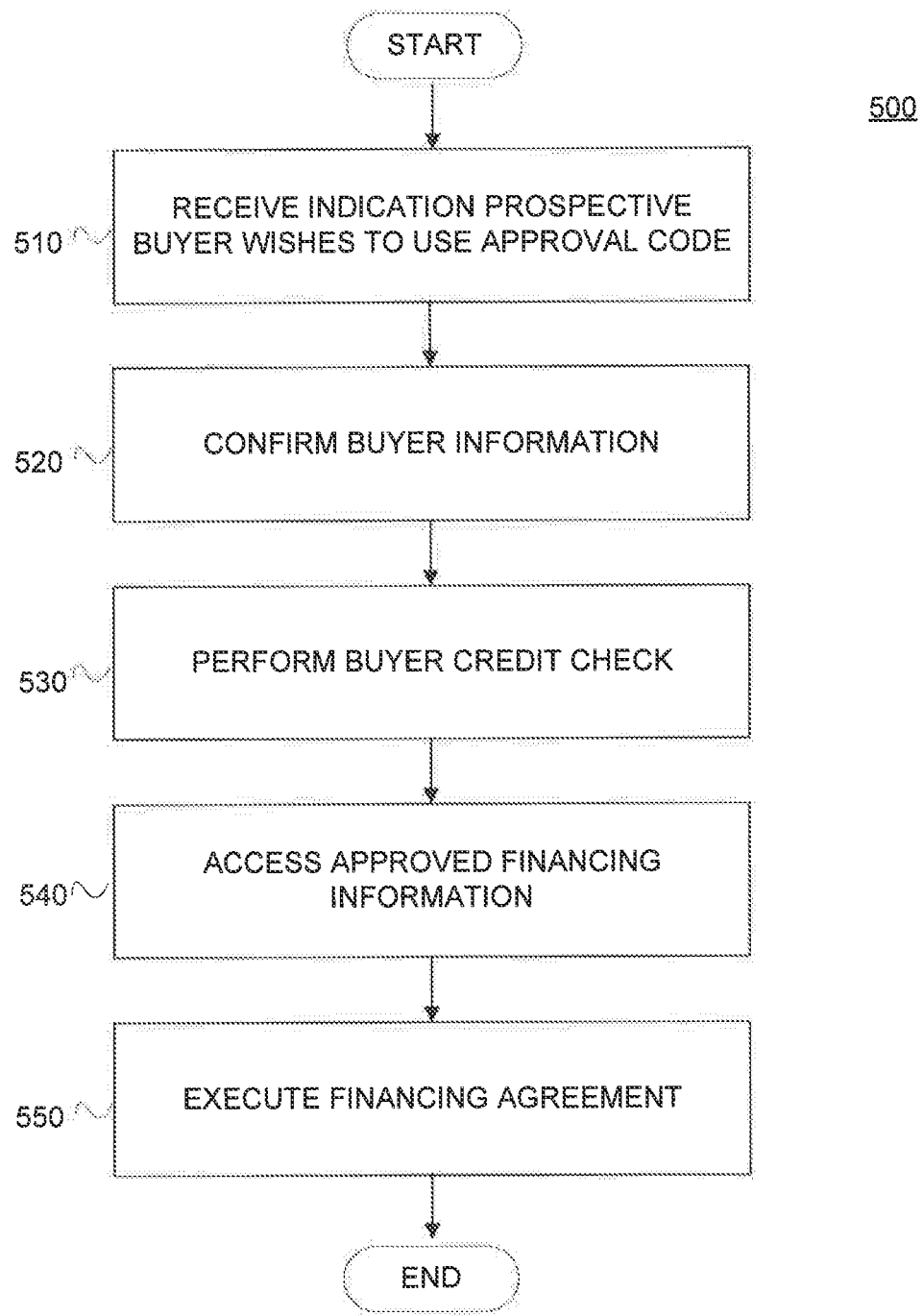
FIG. 5 is a flowchart of an exemplary dealer sales agreement process consistent with disclosed embodiments.

FIG. 5 illustrates an exemplary dealer sales agreement process that may take place, consistent with disclosed embodiments. Sales agreement process 500, as well as any or all of the individual steps therein, may be performed by one or more of financial service system 110 or dealer system 130. For exemplary purposes, FIG. 5 is disclosed as being performed by dealer system 130.

Via network 140, dealer system 130 may receive an indication that the prospective buyer associated with buyer system 120 wants to make an appointment to discuss a specific car listed within inventory database 135, as discussed above. Dealer system 130 may receive the indication via an electronic message sent via the financing website configured by financial service system 110. Dealer system 130 may receive an indication that the prospective buyer wishes to use an approval code associated with an approved loan financed by financial service system 110 (Step 510). The indication may contain other associated information, such as personal information associated with buyer system 120 pertaining to creditworthiness, and/or information associated with the car that the prospective buyer wishes to purchase. In some embodiments, the indication may also be received substantially simultaneously by financial service system 110 and other dealer systems 130. In these embodiments, financial service system 110 and the other dealer systems 130 may transmit one or more notifications to buyer system 120 related to the indication. For example, a dealer system 130 other than the one targeted initially by buyer system 120 may transmit a notification to the prospective buyer that they can receive the same car at a lower price at their dealership, or a car with more options at the same price as compared to the dealership the buyer originally targeted. Financial service system 110 may also send such notifications, and may additionally in some embodiments send buyer system 120 notifications such as updates on inventory across several dealer systems 130.

Dealer system 130 may confirm the information associated with buyer system 120 (Step 520). For example, dealer system 130 may contact the prospective buyer to confirm personal information, verify income, confirm the time of appointment, etc. Dealer system 130 may confirm that the desired car is indeed located within inventory database 135 and is physically situated on the dealership's lot. Additionally, dealer system 130 may confirm that the desired options, trim packages, etc. are present in the specified car. The specific car may be referenced by its Vehicle Identification Number (VIN), a CarFax® reference number, or a reference number associated with the car within inventory database 135. In some embodiments, dealer system 130 may associate the specified car with the approval indicia or code associated with buyer system 120, to effectively "reserve" the car for buyer system 120 pending the buyer's appointment.

Dealer system 130 may perform a second credit check on the prospective buyer associated with buyer system 120 to confirm credit details, particularly if time has passed since the buyer received advance approval (Step 530). The credit check may be substantially similar to the initial credit check performed by financial service system 110 discussed above in conjunction with buyer qualification process 200. In some embodiments, dealer system 130 may access additional information associated with buyer system 120 on external servers via network 140, such as those associated with well-known credit bureaus, or those associated with financial service system 110, or memory 112.

Upon confirmation of the prospective buyer's eligibility, dealer system 130 may access the approved financing information associated with buyer system 120 (Step 540). Financial system 110 may provide dealer system 130 with a direct link to the previously configured financing website. In other embodiments, one or more of financial system 110 and buyer system 120 may provide the approved financing information (such as the approval amount and prospective APR % for the financed loan) to dealer system 130 directly via a telephonic message, SMS text message, electronic mail message, or by postal mail. Dealer system 130 may access the approved financing information while meeting with the prospective buyer, or at a point in time prior to the meeting. Dealer system 130 may download the accessed information to an internal computing device, such as memory 132, or may print out the information in hard copy.

Using the accessed approved financing information and information relating to buyer system 120 and the specific desired car, dealer system 130 may execute a financing and sales agreement for purchase of the automobile (Step 550). The sales agreement may be a standard contract based on the applicable laws of the jurisdiction or jurisdictions detailing the rights and obligations of financial service system 110, buyer system 120, and dealer system 130. The sales agreement may document the steps of the purchase transaction, including logistics and timing for transfer of the item, transfer of funds, and registration of collateral for a loan account associated with the purchase transaction. Buyer system 120 and/or dealer system 130 may provide an indication of agreement to the provided sales agreement. In other embodiments, the buyer system 120 and/or dealer system 130 may indicate modifications to the provided sales agreement, particularly if late edits are made to the approved financing by buyer system 120 using the mobile link to the financing website discussed previously. Upon execution of the sales agreement, buyer system 120, dealer system 130, and financial service system 110 may approve the agreement and store finalized forms in their respective memory devices. Dealer system 130 may then transfer physical possession of the car to buyer system 120, and may further transmit documents and information relating to title and collateral to financial service system 110. In some embodiments, financial service system 110 may then contact buyer system 120 to configure a payment account for setting up monthly payments on the loan.

Figure 6:
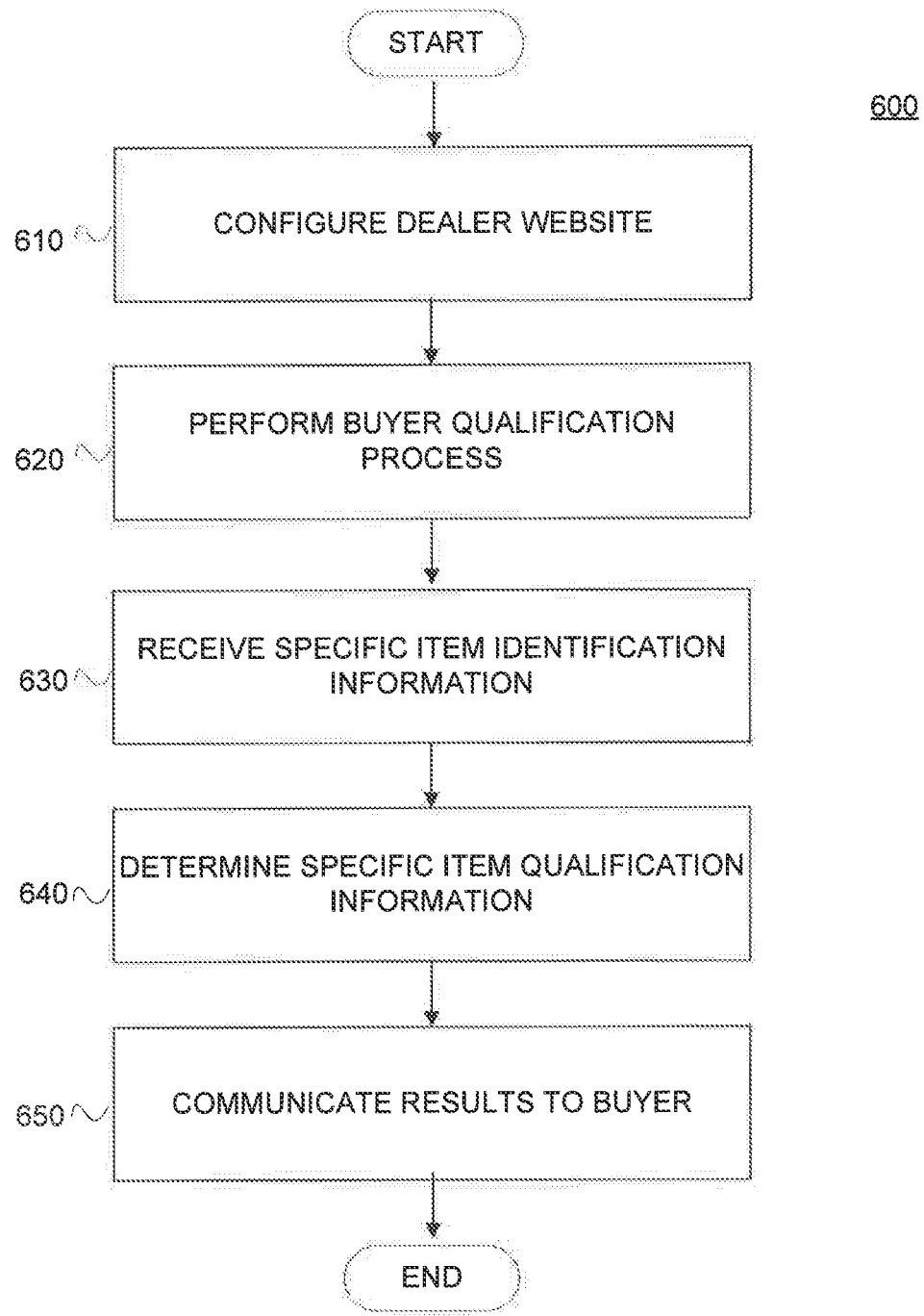
FIG. 6 is a flowchart of an exemplary remote dealer financing process consistent with disclosed embodiments.

In some embodiments, the features and functionalities associated with the financing websites configured for various buyer systems 120 by financial service system 110 may be integrated with a website, mobile application, or other such online presence associated with dealer system 130. FIG. 6 illustrates an exemplary remote dealer financing process consistent with certain disclosed embodiments. Process 600, as well as any or all of the individual steps therein, may be performed by any one or more of financial service system 110 or dealer system 130. For exemplary purposes, FIG. 6 is disclosed as being performed by dealer system 130.

Dealer system 130 may configure an associated website, mobile application, or other such online presence to include features and functionalities of a financing website (Step 610). Dealer system 130 may receive assistance from financial service system 110 in configuring the website. In other embodiments, financial service system 110 may provide dealer system 130 with information and resources to permit one or more dealer systems 130 to configure their own websites. The information and resources may include marketing materials, website or internet portal templates, a dedicated web link to financing options, tailored emails, or tailored model listings designed for sites such as eBay®, Craigslist®, Cars.com®, or Edmunds®, etc. The resources provided to dealer system 130 may further include a widget, frame, or other software-based interface. The resources provided to dealer system 130 may be configure to work with a mobile application on a mobile device. It is understood that the aforementioned resources are not limiting.

Dealer system 130 may receive an indication that a prospective buyer associated with buyer system 120 desires to explore approved financing in advance of a purchase using dealer system 130's financing website. Upon receiving the indication, dealer system 300 may perform a buyer qualification process (Step 620). The buyer qualification process may be substantially similar to buyer qualification process 200 described previously in association with FIG. 2. In brief, dealer system 130 may prompt buyer system 120 for information associated with the prospective buyer, such as identification, proof of employment and/or income, or references. Dealer system 130 may perform a risk assessment of the prospective buyer, such as a credit check. In these embodiments, dealer system 130 may perform only a single credit check, or may perform one credit check during the buyer qualification process and a second check while completing the sales agreement. Dealer system 130 may determine whether to approve the prospective buyer, and if approved, may provide initial qualification information to buyer system 120, such as the approved maximum purchase amount and a range of possible APR % for the loan. Dealer system 130 may provide buyer system 120 with an approval indicia or code similar to that described previously in association with process 200.

After approving buyer system 120, dealer system 130 may receive information relating to a specific car desired by the prospective buyer (Step 630) and may determine specific car qualification information (Step 640) in a manner similar to that described previously in association with specific item approval process 300 and FIG. 3. In short, the information determined may include, as non-limiting examples, information relating to an automobile of a specific make, model, year, and trim package. With respect to that particular car, dealer system 130, potentially in consultation with financial service system 110, may determine the portion of the purchase price of the car eligible for financing (up to and including the full purchase price plus additional costs such as tax, title, license fees, gap insurance, warranties, etc.). Additionally, dealer system 110 may determine a particular monthly payment amount and APR % associated with a financing loan for that particular car. In some embodiments, the loan may be backed by financial service system 110. In other embodiments, dealer system 130 may back the loan itself. Dealer system 130 may search inventory database 135 for the user's desired car. In some embodiments, dealer system 130 may contact other dealer systems 130, or search their inventory databases 135 to attempt to find a car matching that desired by buyer system 120.

Dealer system 130 may communicate the results of the specific car determination to buyer system 120 (Step 650). In some embodiments, dealer system 130 may not possess or have access to the car desired by buyer system 120. In some embodiments, dealer system 130 may simply terminate the process, and recommend other dealer systems 130 to buyer system 120 for further consideration. In other embodiments, dealer system 130 may recommend other cars within its own inventory database 135 that may be attractive to buyer system 120 (e.g. similar price, similar options, similar mileage, different color, etc.). In these embodiments, dealer system 130 may repeat Step 640 as discussed above to determine approved financing costs and interest. The communication exchange may occur instantaneously upon completion of the determination, or may occur at a later time. The communication may again occur through the previously configured financing website associated with dealer system 130, or it may occur by telephone, electronic mail, SMS message, or postal mail. Once results are communicated, buyer system 120 and dealer system 130 may coordinate future steps in the purchase transaction, such as a test drive and/or an appointment to execute a sales agreement, as discussed above.

Figure 7:
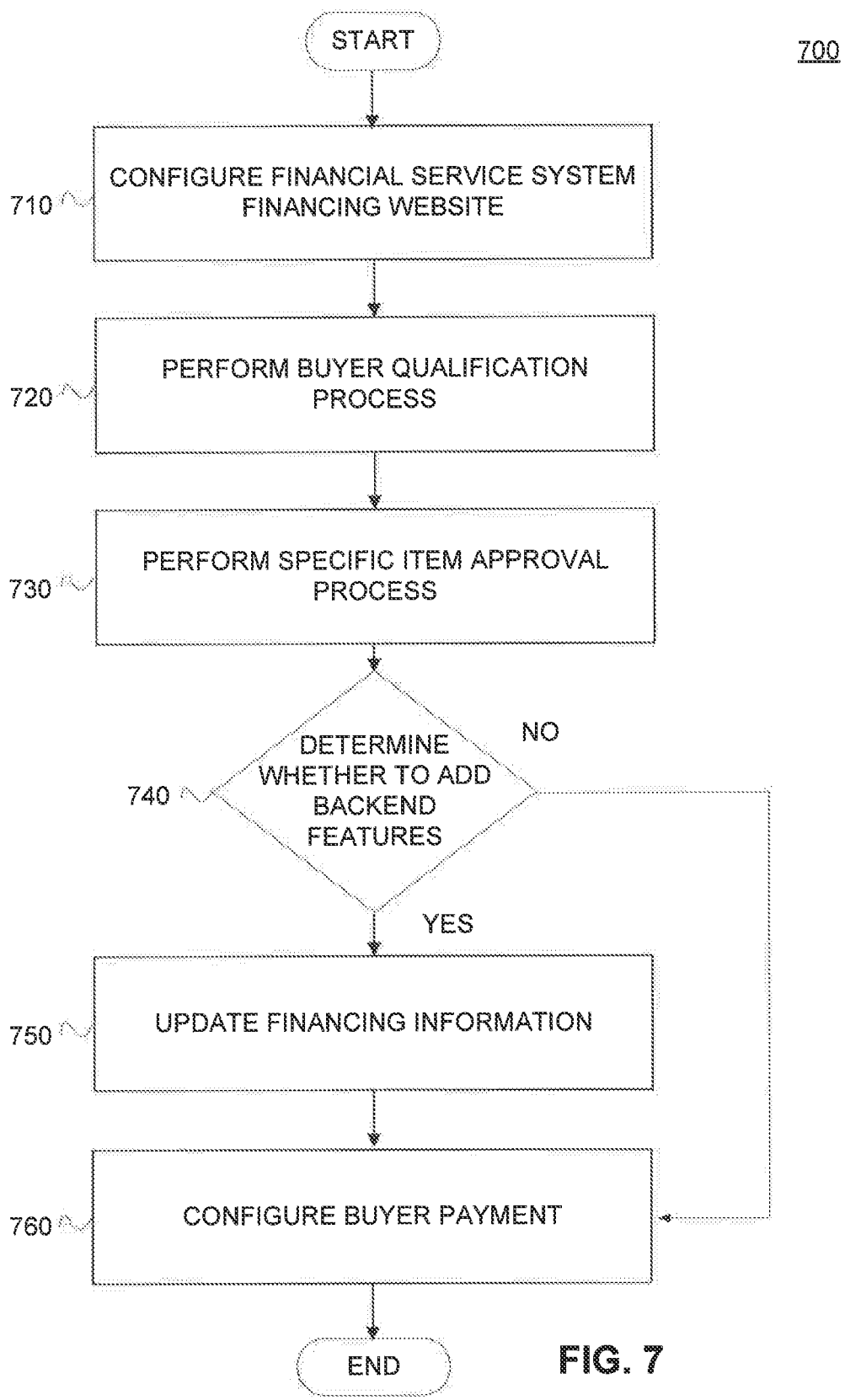
FIG. 7 is a flowchart of an exemplary financing and payment process consistent with disclosed embodiments.

In some embodiments, the disclosed embodiments may further comprise the capability to not only provide buyer system 120 with approval for a loan in advance of a purchase, but also coordinate payment for the purchase. FIG. 7 illustrates an exemplary financing and payment process 700 consistent with certain disclosed embodiments. Process 700, as well as any or all of the individual steps therein, may be performed by any one or more of financial service system 110 or dealer system 130. For exemplary purposes, FIG. 7 is disclosed as being performed by financial service system 110.

Similar to the processes described previously, financial service system 110 may configure a financing website for purposes of providing approved financing in advance of a purchase to a buyer system 120 (Step 710). Financial service system 110 may further perform a buyer qualification process, such as process 200 described above (Step 720). Additionally, financial service system 110 may perform a specific item approval process to provide buyer system 120 with financing information about a specific desired automobile, such as process 300 described above (Step 730). The item approval process may include a dealer matching process, such as process 400 described above. As disclosed, financial service system 110 may provide information relating to one or more dealer systems 130 to buyer system 120, and buyer system 120 may select a particular dealership to visit. Buyer system 120 may provide an approval code to the selected dealer system 130, or financial service system 110 may forward the code to system 130 along with a link to the approved financing information.

In some embodiments, financial service system 110 may determine whether to add so-called "backend" features to the loan (Step 750). These features may be additional products or services offered by dealer system 130, and may include warranties, maintenance contracts, additional options or features, gap auto insurance coverage, or any other value-added benefit for dealer system 130. In some embodiments, financial service system 110 may partner with dealer system 130 to offer the backend features to the user via the financing website. In some embodiments, financial service system 110 may build room into the loan approved for buyer system 120 to accommodate certain backend features, and may provide a guarantee of a certain amount of purchased features to dealer system 130. Using the mobile link to the financing website provided by financial service system 110, buyer system 120 may decide to add one or more backend features to their loan (Step 740: YES), and may utilize the mobile link to update the financing information and recalculate specific parameters of the financing (Step 750). In some embodiments, buyer system 120 may decline to add additional backend features, and the loan may remain with the same parameters as were set during the advanced approval process (Step 740: NO) and proceed to Step 760.

Financial service system 110 may configure payment for the purchase made by buyer system 120 (Step 760). In the processes described previously, such as dealer sales agreement 500, the loan may be processed and paid using conventional offline methods known in the art. In Step 760, financial service system 110 may utilize the configured features of the digital financing website to also configure easy, direct payments—providing security and convenience to both buyer system 120 and dealer system 130. In these embodiments, financial service system 110 may receive a notification via the financing website that buyer system 120 and dealer system 130 agree to use the direct pay option. Financial service system 110 may configure a payment to dealer system 130 in the amount of the approved financing, and may concurrently configure a payment account for buyer system 120. In some embodiments, financial service system 110 may configure a new account for buyer system 120, or if buyer system 120 already has a financial service account with system 110, the car payment may be linked to that existing account. In some embodiments, financial service system 110 may additionally configure an automatic debit to withdraw the loan payment at the end of each payment period from one or more financial service accounts configured for buyer system 120.

FIG. 8 shows an exemplary user interface that may be provided by the disclosed embodiments to facilitate submission of buyer information. For example, as described above in association with Step 220 of buyer qualification process 200, financial service system 110 may configure a financing website to receive prospective buyer information from buyer system 120. Aspects of the disclosed embodiments include software processes that, when executed by processors 111 and 121, generate and provide the content, questions, solicitations, etc. included in the user interface provided to buyer system 120 to upload, receive, and process the information. Aspects of the disclosed embodiments may allow the customer to upload the requested documents, such as government-issued identification, proof of income via pay stubs or bank statements, etc. in any suitable electronic format, including, for example, JPEGs, GIFs, PDFs, spreadsheets, or text files. The user interface of FIG. 8 is exemplary and not limiting to the aspects of the disclosed embodiments. Other formats, types of content, queries, mechanisms for uploading, etc. can be implemented to allow financial service system 110 to receive and process buyer information from buyer system 120.

FIG. 9 shows an exemplary user interface that may be provided by the disclosed embodiments to facilitate submission of specific item information. For example, as described above in association with specific item approval process 300, financial service system 110 may configure a financing website to receive information from buyer system 120 relating to the specific item desired to be purchased, such as specific automobile or type of automobile. Aspects of the disclosed embodiments include software processes that, when executed by processors 111 and 121, generate and provide the content, questions, solicitations, etc. included in the user interface provided to buyer system 120 to receive, and process the information. Queries presented to the customer may include, but are not limited to, whether the vehicle is new or used, the year, make, and model of the vehicle, and optional items such as trim patterns, accessories, etc. Aspects of the disclosed embodiments may allow buyer system 120 to select answers to the various queries presented. In some embodiments, buyer system 120 may select desired answers from drop-down menus, as shown in FIG. 9. In other embodiments, the prospective buyer may be able to type in answers to the queries using an interface (touchscreen, keyboard, or other suitable input device) associated with buyer system 120. The user interface of FIG. 9 is exemplary and not limiting to the aspects of the disclosed embodiments. Other formats, types of content, queries, mechanisms for uploading, etc. can be implemented to allow financial service system 110 to receive and process specific desired item information from buyer system 120.

Figure 10:
FIG. 10 is an exemplary user interface for receiving approval for a specific item that may be provided by the disclosed embodiments.

FIG. 10 shows an exemplary user interface that may be provided by the disclosed embodiments to facilitate communication of approval for a specific item. For example, as described above in association with specific item approval process 300, financial service system 110 may determine the extent to which an approved buyer, such as the prospective buyer associated with buyer system 120, can apply their advance-approved loan to a specific automobile. Aspects of the disclosed embodiments include software processes that, when executed by processors 111 and 121, generate and provide the content, questions, solicitations, etc. included in the user interface provided to buyer system 120 to generate, present, receive, and process the information. In addition to presenting information to buyer system 120, additional queries may be presented to provide further customization and control of the loan. Queries presented to the customer may include, but are not limited to, the desired length of the loan, whether or not a warranty will be purchased, whether additional features will be added, etc. Aspects of the disclosed embodiments may allow buyer system 120 to select answers to the various queries presented. In some embodiments, buyer system 120 may select desired answers from drop-down menus, as shown in FIG. 10. In other embodiments, the prospective buyer may be able to type in answers to the queries using an interface (touchscreen, keyboard, or other suitable input device) associated with buyer system 120. The user interface of FIG. 10 is exemplary and not limiting to the aspects of the disclosed embodiments. Other formats, types of content, queries, mechanisms for uploading, etc. can be implemented to allow financial service system 110 to transmit and receive information to and from buyer system 120.

FIG. 11 shows an exemplary user interface that may be provided by the disclosed embodiments to provide information about participating dealers. For example, as described above in association with dealer matching process 400, financial service system 110 may determine participating dealer systems 130 that have the specific desired item in their inventory. Financial service system 110 may then communicate the matching dealer systems 130 to buyer system 120. Aspects of the disclosed embodiments include software processes that, when executed by processors 111 and 121, generate and provide the content included in the user interface provided to buyer system 120. In addition to presenting textual information in list form to buyer system 120, the user interface may contain additional visual representations of dealer systems 130, such as a map. Aspects of the disclosed embodiments include software processes that, when executed by processors 111 and 121, generate the information relating to map elements, and visually display them to buyer system 120. The user interface of FIG. 11 is exemplary and not limiting to the aspects of the disclosed embodiments. Other formats, types of content, queries, mechanisms for uploading, etc. can be implemented to allow financial service system 110 to transmit information relating to dealer systems 130 to buyer system 120.

FIG. 12 shows an exemplary user interface that may be provided by the disclosed embodiments to provide summary information about the financing process. For example, as described above in association with processes 300 and 400, financial service system 110 may gather buyer information from buyer system 120, receive and process further information about a specific car desired, and match buyer system 120 with potential dealer systems 130. Aspects of the disclosed embodiments include software processes that, when executed by processors 111 and 121, generate and provide the content included in the user interface provided to buyer system 120. In addition to presenting textual information in list form to buyer system 120, the user interface may contain additional visual representations such as a map. Aspects of the disclosed embodiments include software processes that, when executed by processors 111 and 121, generate further potential functionalities, such as setting an appointment with dealer system 130, coordinating a test drive, getting directions, and getting copies of information relating to the approved financing. Importantly, the user interface of FIG. 12 may also provide buyer system 120 with a link to the summary information that can be accessed and edited on mobile devices, such as smartphones, tablets, or portable computer systems. In these embodiments, buyer system 120 retains full control of the financing, and can make changes to their loan terms while negotiating face-to-face with dealer systems 130. The user interface of FIG. 12 is exemplary and not limiting to the aspects of the disclosed embodiments. Other formats, types of content, queries, mechanisms for uploading, etc. can be implemented to allow financial service system 110 to transmit summary information to buyer system 120.

Other features and functionalities of the described embodiments are possible. For example, the processes of FIGS. 2-7 are not limited to the sequences described above. Variations of these sequences, such as the removal and/or the addition of other process steps may be implemented without departing from the spirit and scope of the disclosed embodiments.

Additionally, the disclosed embodiments may be applied to different types of sales. Any financial service institution that provides loan accounts to customers may employ systems, methods, and articles of manufacture consistent with certain principles related to the disclosed embodiments. In addition, any buyer or seller of an item in a private transaction may also employ systems, methods, and articles of manufacture consistent with certain disclosed embodiments.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but are instead defined by the appended claims in light of their full scope of equivalents.

What is claimed is:

1. A method for providing an interface for a mobile device to update financing terms for a loan and configured to purchase a vehicle, the method comprising:
    providing, to a mobile device, user interface instructions for displaying an interface on the mobile device for a buyer to purchase a vehicle;
    receiving, via the interface of the mobile device, a search request including information relating to a class of vehicles that the buyer seeks to purchase;
    determining, from an inventory of one or more dealer systems, that one or more dealers has a vehicle relating to the search request in inventory;
    providing, via the interface of the mobile device, information identifying the one or more dealers and each respective vehicle;
    receiving, via the interface of the mobile device, a selection from the buyer from the provided information of the one or more dealers;
    transmitting a notice to a dealer system associated with the selected dealer that the buyer selected the respective vehicle and the respective dealer, whereby the notice further includes a set of prequalification loan terms for the buyer;
    receiving a notification that at least one prequalification loan term for the buyer changed;
    providing, to the buyer in response to the notification and via the interface of the mobile device, an access link that when selected provides remote access to a graphical user interface that comprises at least one indication of at least one changed prequalification loan term;
    in response to the access link being accessed, receiving, via the interface of the mobile device, a request to approve or alter one or more changed prequalification loan terms;
    determining updated financing information, based on the one or more altered terms received via the interface of the mobile device;
    associating an approval code with the updated financing information; and
    communicating the updated financing information to the dealer system of the selected dealer by providing the approval code and a link for accessing the interface identifying the at least one changed prequalification loan term.

2. The method of claim 1, further comprising:
    receiving a new notification that the vehicle has been purchased with the set of prequalification loan terms; and
    receiving instructions to initiate payment for the purchased vehicle.

3. The method of claim 1, further comprising adding at least one of a warranty, a maintenance contract, an additional option, or gap insurance coverage to the set of prequalification loan terms.

4. The method of claim 1, wherein the search request further comprises analyzing, via the interface of the mobile device, a prequalification determination by:
    receiving, via the interface of the mobile device, an indication that the buyer seeks to secure approved loan financing to purchase the vehicle in advance of the purchase;
    receiving, via the interface of the mobile device, personal information associated with the buyer;
    performing a risk assessment of the buyer based on the received personal information; and
    providing, via the interface of the mobile device, qualification information to the buyer based on the risk assessment, wherein the qualification information comprises at least an amount of an approved loan and an interest rate for the updated financing information.

5. The method of claim 4, wherein the received personal information comprises an electronic document uploaded via the interface of the mobile device, the electronic document providing an identification of the buyer, proof of income, contact information, or references.

6. The method of claim 5, wherein the approval code is a reference number for the approved loan.

7. The method of claim 4, wherein communicating the updated financing information to the dealer system of the selected dealer further comprises communicating the qualification information to the dealer system of the selected dealer.

8. The method of claim 4, further comprising:
    receiving a request from the dealer system to confirm the personal information associated with the buyer; and
    sending a response to the dealer system confirming the personal information associated with the buyer.

9. The method of claim 8, wherein the request from the dealer system further comprises a request to compare at least one of a name, an address, a social security number, or a government-issued identification provided by the buyer and stored by the dealer system with the received personal information.

10. The method of claim 1, wherein the received information relating to the class of vehicles the buyer seeks to purchase comprises at least one of a vehicle identification number (VIN), a make of the vehicle, a model of the vehicle, an age of the vehicle, a feature of the vehicle, or whether the vehicle is new or used.

11. The method of claim 1, wherein the set of prequalification loan terms further comprises at least one of an estimated monthly payment amount or an interest rate for an approved loan.

12. The method of claim 1, further comprising:
identifying a location on a map of possible dealers via the interface of the mobile device;
providing user ratings and reviews associated with each dealer in the inventory; and
providing an incentive offer associated with each dealer in the inventory.

13. The method of claim 1, further comprising providing, via the interface of the mobile device, an alternative class of vehicles based on the search request.

14. The method of claim 1, further comprising displaying, via the interface of the mobile device, an offer related to the selected vehicle, the offer comprising at least one of a warranty, a maintenance contract, an additional option, or gap insurance coverage to the approved loan.

15. The method of claim 1, further comprising prompting the buyer, via the interface of the mobile device, to configure a payment account for making monthly payments.

16. The method of claim 1, further comprising configuring a payment account associated with the buyer for making monthly payments on the loan.

17. The method of claim 1, further comprising providing via the interface of the mobile device, a link to a website of each dealer in the inventory of the one or more dealers.

18. A non-transitory computer-readable medium for storing instructions that, when executed by one or more processors, cause the one or more processors to perform operations for providing an interface on a mobile device to update financing terms for a loan to purchase a vehicle, the operations comprising:
providing, to a mobile device, user interface instructions for displaying an interface on the mobile device for a buyer to purchase a vehicle;
receiving, via the interface of the mobile device, a search request including information relating to a class of vehicles that the buyer seeks to purchase;
determining, from one or more dealer systems, that one or more dealers has a vehicle relating to the search request in inventory;
providing, via the interface of the mobile device, information identifying the one or more dealers and each respective vehicle;
receiving, via the interface of the mobile device, a selection from the buyer from the provided information of one or more dealers;
transmitting a notice to a dealer system associated with the selected dealer that the buyer selected the respective vehicle and the respective dealer, whereby the notice further includes a set of prequalification loan terms for the buyer;
receiving a notification that at least one prequalification loan term for the buyer changed;
providing, to the buyer in response to the notification and via the interface of the mobile device, an access link that when selected provides remote access to a graphical user interface that comprises at least one indication of at least one changed prequalification loan term;
in response to the access link being accessed, receiving, via the interface of the mobile device, a request to approve or alter one or more of changed the prequalification loan terms;
determining updated financing information, based on the one or more altered terms received via the interface of the mobile device;
associating an approval code with the updated financing information; and
communicating the updated financing information to the dealer system of the selected dealer by providing the approval code and a link for accessing the interface identifying the at least one changed prequalification loan term.

* * * * *